(12) United States Patent
Johnson et al.

(10) Patent No.: US 6,815,873 B2
(45) Date of Patent: Nov. 9, 2004

(54) RELEASABLE FASTENER SYSTEM

(75) Inventors: Nancy L. Johnson, Northville, MI (US); Alan L. Browne, Grosse Pointe, MI (US); William Barvosa-Carter, Ventura, CA (US); Leslie A. Momoda, Los Angeles, CA (US); Thomas B. Stanford, Port Hueneme, CA (US)

(73) Assignee: General Motors Corporation, Detroit, MI (US)

( * ) Notice: Subject to any disclaimer, the term of this patent is extended or adjusted under 35 U.S.C. 154(b) by 120 days.

(21) Appl. No.: 10/305,422

(22) Filed: Nov. 26, 2002

(65) Prior Publication Data

US 2004/0075365 A1 Apr. 22, 2004

Related U.S. Application Data

(63) Continuation-in-part of application No. 10/273,691, filed on Oct. 19, 2002.

(51) Int. Cl.[7] .............................................. H01L 41/08
(52) U.S. Cl. ...................................... 310/331; 310/332
(58) Field of Search ............................... 310/328, 330, 310/331, 332

(56) References Cited

U.S. PATENT DOCUMENTS

| 3,138,749 | A | * | 6/1964 | Stibitz ........................ 318/135 |
| 3,292,019 | A | * | 12/1966 | Hsu et al. ................... 310/328 |
| 4,382,243 | A | * | 5/1983 | Babitzka et al. ............. 335/219 |
| 4,391,147 | A | * | 7/1983 | Krempl et al. ............... 73/730 |
| 5,133,112 | A | | 7/1992 | Gomez-Acevedo .......... 24/450 |
| 5,136,201 | A | * | 8/1992 | Culp ........................... 310/328 |
| 5,182,484 | A | * | 1/1993 | Culp ........................... 310/328 |
| 5,319,257 | A | * | 6/1994 | McIntyre ..................... 310/328 |
| 5,712,524 | A | * | 1/1998 | Suga ........................... 310/328 |
| 6,086,599 | A | | 7/2000 | Lee et al. ..................... 606/108 |
| 2002/0062547 | A1 | | 5/2002 | Chiodo et al. .............. 29/426.5 |

FOREIGN PATENT DOCUMENTS

WO  WO 01/84002  11/2001

OTHER PUBLICATIONS

U.S. patent application Publication, US 2002/0050045 A1, published May 2, 2002.

* cited by examiner

*Primary Examiner*—Mark Budd
(74) *Attorney, Agent, or Firm*—Kathryn A. Marra

(57) ABSTRACT

A releasable fastener system comprises a male portion and a female portion. The male portion comprises a support and at least one protrusion element fixedly attached to the support. The female portion comprises a support and at least two parallel actuator strips projecting from a surface of the support. The at least two parallel actuator strips are spaced apart to form an opening equal to or less than a lateral dimension of the protrusion element. Each one of the at least two parallel actuator strips comprise a flexible strip and a piezoelectric material disposed on portions of the actuator strip. An activation device is coupled to the at least two actuator strips, the activation device being operable to selectively provide an activation signal to the piezoelectric material. In this manner, the shape of the actuator strips can be changed to provide a mechanical engagement of a frictional engagement of the male and female portions.

12 Claims, 4 Drawing Sheets

RELEASABLE FASTENER SYSTEM

CROSS-REFERENCE TO RELATED APPLICATIONS

This application is a Continuation in Part of U.S. application Ser. No. 10/273,691 filed Oct. 19, 2002, which is incorporated by reference herein in its entirety.

BACKGROUND

This disclosure relates to releasable attachment devices of the type used to fasten, retain, or latch together components of an apparatus or a structure that are to be separated or released under controlled conditions.

BRIEF SUMMARY

Disclosed herein is a releasable fastener system comprising a male portion comprising a support and at least one protrusion element fixedly attached to the support; a female portion comprising a support and at least two parallel actuator strips projecting from a surface of the support, wherein the at least two parallel actuator strips are spaced apart to form an opening equal to or less than a lateral dimension of the protrusion element, and wherein each one of the at least two parallel actuator strips comprise a flexible strip and a piezoelectric material disposed on portions of the actuator strip; and an activation device coupled to the at least two actuator strips, the activation device being operable to selectively provide an activation signal to the piezoelectric material.

A process for operating a releasable fastener system comprises frictionally engaging at least one protrusion element of a male portion with an opening provided by at least two parallel actuator strips projecting from a surface of a female portion, wherein the at least two actuator strips comprise a flexible strip and a piezoelectric material disposed on portions of the actuator strip, wherein the flexible strip is fixedly attached at one end to a stationary support and is fixedly attached at an other end to a non-stationary support, and wherein the portions of the actuator strip comprising the piezoelectric material contact the protrusion element; and applying an activation signal to the piezoelectric material to increase the opening between the at least two actuator strips and release the protrusion element.

In accordance with another embodiment, a process for operating a releasable fastener system comprises aligning at least one protrusion element of a male portion with an opening provided by at least two parallel actuator strips projecting from a support of a female portion, wherein the at least one protrusion element comprises a head portion and a body portion, wherein the head portion has a greater lateral dimension than the body portion and forms a recess portion at an interface of the head and body portions, and wherein the at least two actuator strips comprises a flexible strip and a piezoelectric material disposed on portions of the flexible strip; pressing the head portion of the at least one protrusion element into the opening to mechanically engage the recess portion of the at least one protrusion element against the actuator strips; applying an activation signal to the piezoelectric material to bend the flexible strip and increase a size of the opening between the at least two actuator strips; and removing the at least one protrusion element from the at least two actuator strips.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 1:
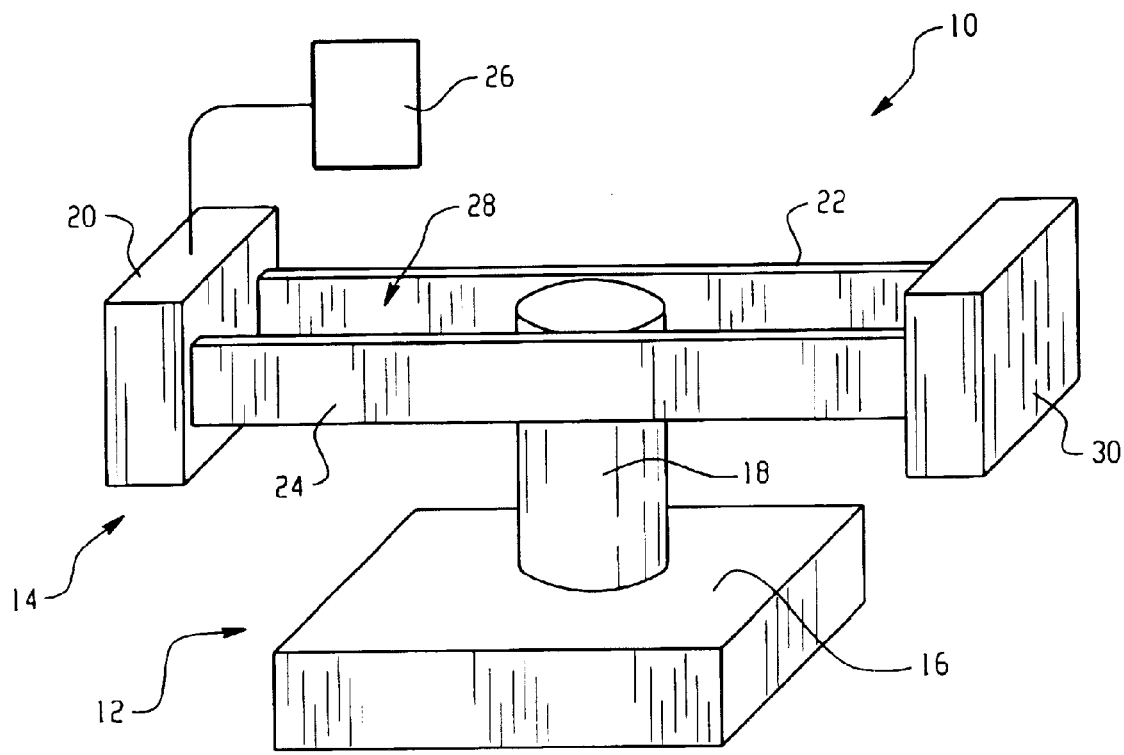
FIG. 1 is a front perspective view of a releasable fastening system.
Figure 2:
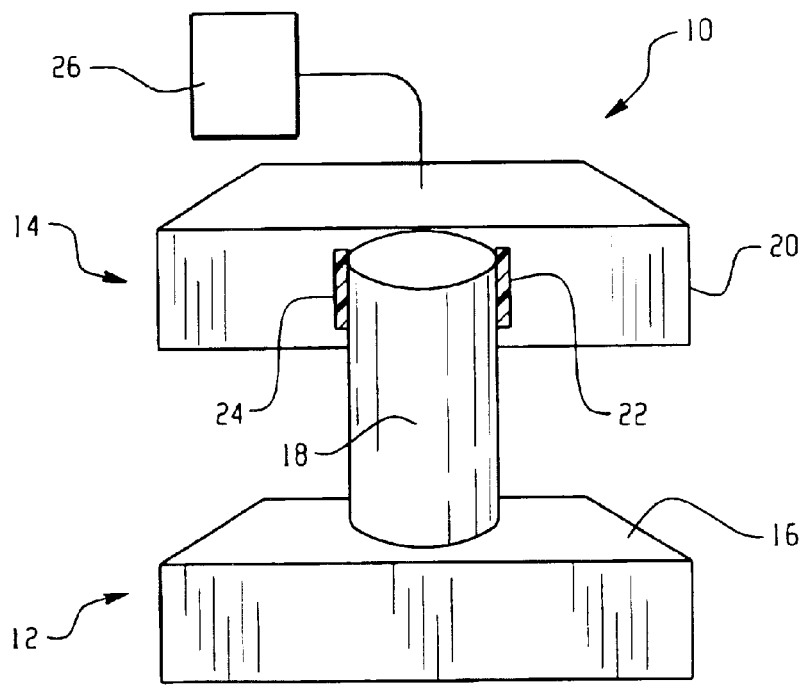
FIG. 2 is a right side perspective view of the releasable fastening system of FIG. 1.

FIGS. 1 and 2 illustrate a releasable fastener system, generally indicated as 10, comprising a male portion 12 and a female portion 14. The male portion 12 includes a support 16 and at least one protrusion element 18 disposed on a surface of the support 16. The female portion 14 includes at least one support 20 and at least two actuator strips 22, 24 projecting from a surface of the least one support 20. Optionally, the female portion 14 further includes support 30, wherein one end of the actuators strips 22, 24 are fixedly attached to support 20 and the other end of the actuator strips 22, 24 are fixedly attached to support 30. Each actuator strip, 22 or 24, generally comprises a flexible strip 31 and a piezoelectric material 32 disposed on selected portions of the flexible strip (shown more clearly in FIGS. 10 and 11). As used herein, the term "piezoelectric" is used to describe a material that mechanically deforms (i.e., changes shape) when a voltage potential is applied. The deformation may be caused by expansion or contraction of the piezoelectric material. Coupled to and in operative communication with the at least two actuator strips 22, 24 is an activation device 26. The activation device 26 provides, on demand, an activation signal, e.g., an electrical signal, to the piezoelectric material to change the shape orientation of the actuator strips 22, 24. The change in shape orientation generally remains for the duration of the applied activation signal. Upon discontinuation of the activation signal, the actuator strips 22, 24 revert substantially to an unpowered relaxed state. The illustrated releasable fastener system 10 is exemplary only and is not intended to be limited to any particular shape, size, configuration, number or shape of supports 20, number or shape of the actuator strips 22, number or shape of the protrusion elements 18, or the like.

In a preferred embodiment, the at least two actuator strips, 22, 24, in an unpowered state, are positioned substantially parallel to one another and are fixedly attached at one end to support 20 as shown. More preferably, the other ends of the actuator strips 22, 24 are fixedly attached to support 30. The at least two actuator strips 22, 24 preferably have a substantially straightened shape orientation in the unpowered state. The preferred spatial distribution of the actuator strips 22, 24 can be defined in relation to the protrusion element 18. The actuator strips 22, 24 are preferably arranged such that the at least two adjacent actuator strips 22, 24 form an opening 28. The width of any given opening 28, i.e., the space between two adjacent unpowered actuator strips 22, 24, is preferably equal to or less than the greatest lateral dimension of the protrusion element 18 located on support 16. In other words, if the protrusion element 18 were cylindrically shaped as shown in FIG. 1, opening 28 preferably has a width generally equal to or less than a diameter of the cylindrically shaped protrusion element 18. In this, manner, engagement of the male portion 12 and the female portion 14 results in a frictional engagement or a mechanical engagement depending on the dimensions and shape of the protrusion element 18 relative to the opening 28 provided by the at least two actuator strips 22, 24. During disengagement, the shape orientation of the actuator strips 22, 24 is altered to change the size of the opening 28 and reduce the frictional forces associated with the frictional engagement or change the size of the opening 28 for disengaging the mechanical engagement, i.e., opening 28 in the powered state is greater than the greatest lateral dimension of the protrusion element 18 such that the protrusion element 18 can be removed from the actuator strips 22, 24.

Figure 3:
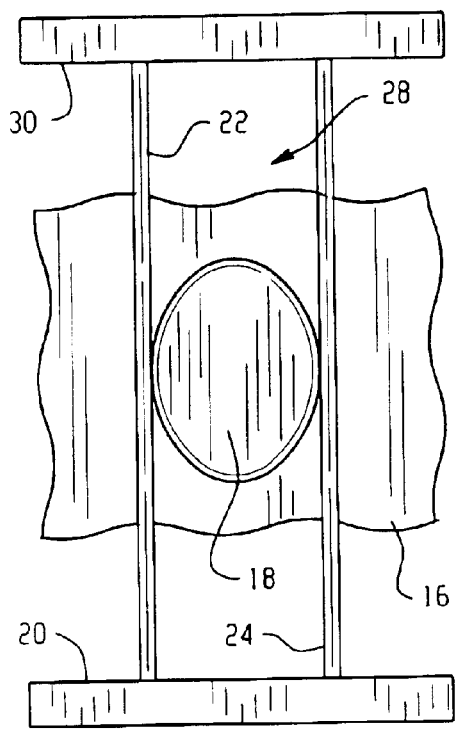
FIG. 3 is a top down cross sectional view of a releasable fastener illustrating a frictional engagement mechanism.
Figure 4:
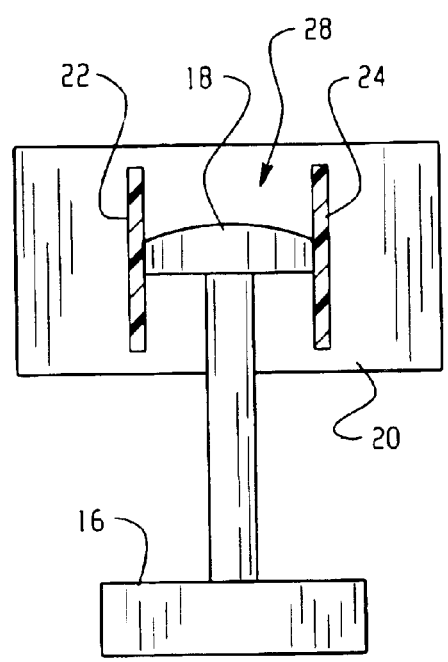
FIG. 4 is a side cross sectional view of the releasable fastening system depicted in FIG. 3.

FIGS. 3 and 4 illustrate one embodiment, wherein engagement of the protrusion element 18 with the actuator strips 22, 24 results in a frictional engagement. In this embodiment, the actuator strips 22, 24 are preferably attached to both supports 20, 30. In the unpowered state as shown in FIGS. 3 and 4, opening 28 provided by the actuator strips 22, 24 is about equal to or less than a lateral dimension of the protrusion element 18. In this manner, engagement of the male portion 12 with the female portion 14 results in the protrusion element 18 becoming frictionally engaged against opposing actuators strips 22, 24. The resulting frictional engagement formed is relatively strong in shear and pull-off directions, and if a large number of mating male and female portions are used and the male portions are disposed on a flexible surface then the engagement will be weak in a peel direction.

Figure 5:
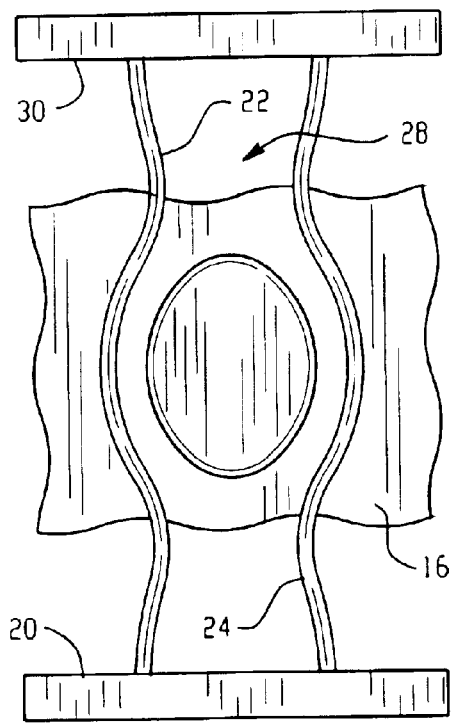
FIG. 5 is a top down cross sectional view of a releasable fastener illustrating disengagement of the frictional engagement mechanism shown in FIG. 3.
Figure 6:
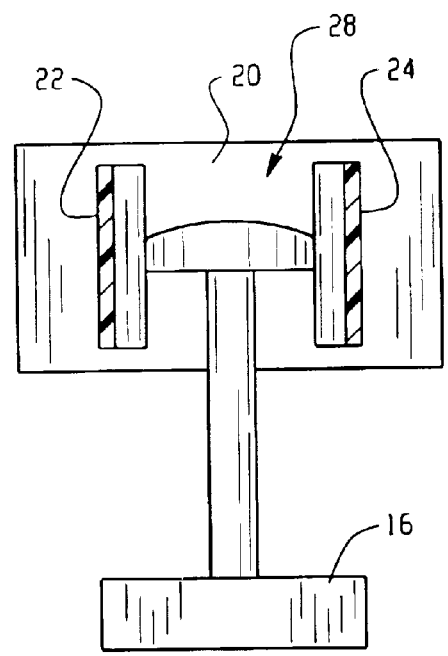
FIG. 6 is a side cross sectional view of a releasable fastener illustrating disengagement of the frictional engagement mechanism shown in FIG. 5.

In the powered state as shown in FIGS. 5 and 6, the opening 28 provided by the actuator strips 22, 24 changes to provide a larger opening, which reduces the frictional forces that provided the engagement. That is, an activation signal applied to the actuator piezoelectric material causes the actuator strips 22, 24 to bend at the selected portions of the respective strip comprising the piezoelectric material. It should be noted that in order for the shape change to occur, one of the supports 20 or 30 is fixed or stationary and the other support is flexible and/or non-stationary since the change in shape orientation to the actuator strips 22, 24 results in a decrease in the length of the actuator strips 22, 24. The specific location of the piezoelectric material 32 on the flexible strip 31 that forms the actuator strip 22 or 24 can be varied to provide different changes in shape configurations depending on the particular application. In the particular embodiment as shown, the piezoelectric material was disposed about portions of the actuator strips 22, 24 that contact the protrusion element 18 during the engagement. Advantageously, maintaining engagement in the unpowered state provides a significant commercial advantage since energy resources are not employed to continuously maintain the engagement. It is only in the powered state that energy is required to provide the remote release of the two portions 12, 14.

Figure 7:
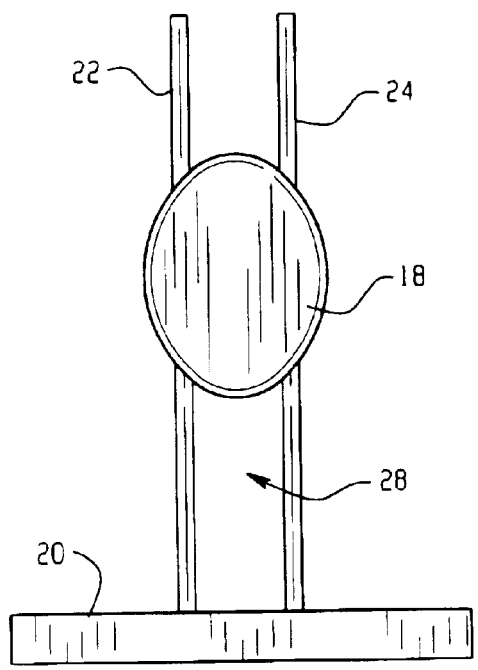
FIG. 7 is a top down cross sectional view of a releasable fastener illustrating a mechanical engagement mechanism.
Figure 8:
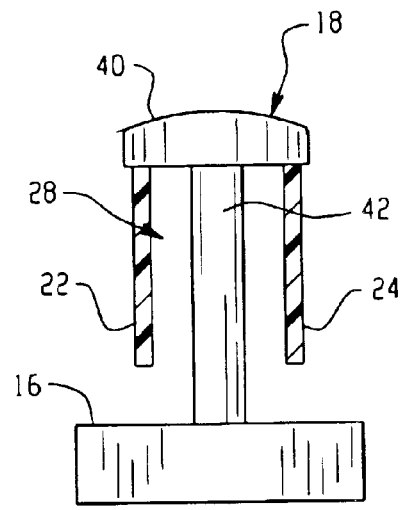
FIG. 8 is a side cross sectional view of the releasable fastening system illustrating a frictional engagement mechanism.

FIGS. 7 and 8 illustrate another embodiment, wherein the engagement of the male portion 12 with the female portion 14 results in a mechanical engagement. In this embodiment, the protrusion element 18 preferably comprises a body portion 40 and a head portion 42, wherein the lateral dimensions of the head portion 42 are greater than the lateral dimensions of the body portion 40. Preferably, at an interface between the body portion 40 and the head portion 42, there is a recess portion 44. During engagement, the male portion 12 and the female portion 14 are pressed together such that the head portion 42 of the protrusion element 18 physically pushes against the actuator strips to enlarge the opening 28 defined by strips 22, 24, and then clears the actuator strips 22, 24, which then causes the actuator strips 22, 24 to revert to a substantially straightened orientation. Once the head portion 42 clears the actuator strips 22, 24, the recess portion 44 abuts the actuator strips 22, 24 and prevents separation of the male portion 12 from the female portion 14. That is, the opening cannot accommodate the head portion 42 without mechanical breakage of some form, i.e., breakage of the actuator strips 22, 24 or breakage of the head portion 42. Thus, the resulting mechanical engagement formed by the mating of the male portion 12 with the female portion 14 in this manner is relatively strong in peel, shear, and pull-off directions. It is noted that the mechanical engagement can employ a single support 20, or two supports 20, 30 as previously described.

Figure 9:
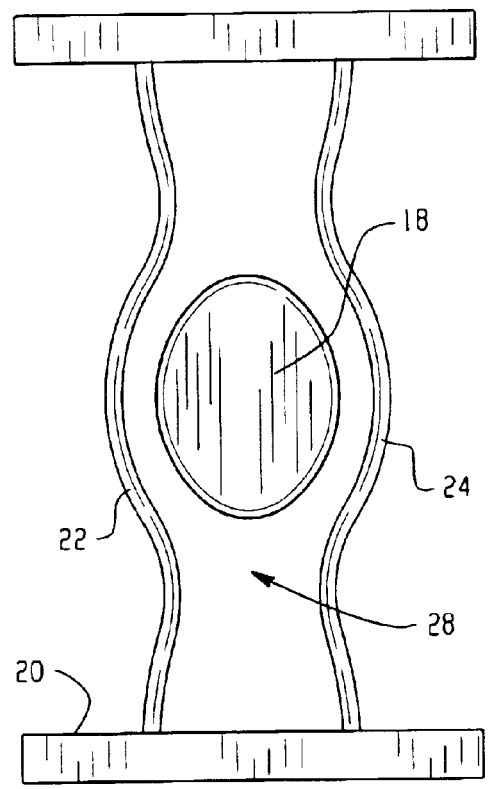
FIG. 9 is a top down cross sectional view of a releasable fastener illustrating a mechanical engagement mechanism.
Figure 10:
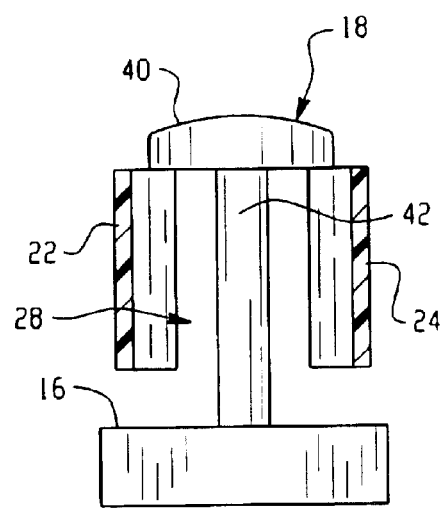
FIG. 10 is a side cross sectional view of the releasable fastening system illustrating a frictional engagement mechanism.

In order to effect disengagement, an activation signal is applied to the actuator strips 22, 24 to cause a change in shape orientation. The change in shape orientation to the actuator strips 22, 24 creates an opening 28 that is effective to permit the head portion 42 of the protrusion element 18 to pass therethrough. FIGS. 9 and 10 illustrate one such opening 28 provided by the actuator strips 22, 24 that is suitable for disengagement. Again, the opening 28 provided by the actuator strips 22, 24 can be varied depending on the materials employed and the location of the piezoelectric material.

Figure 11:
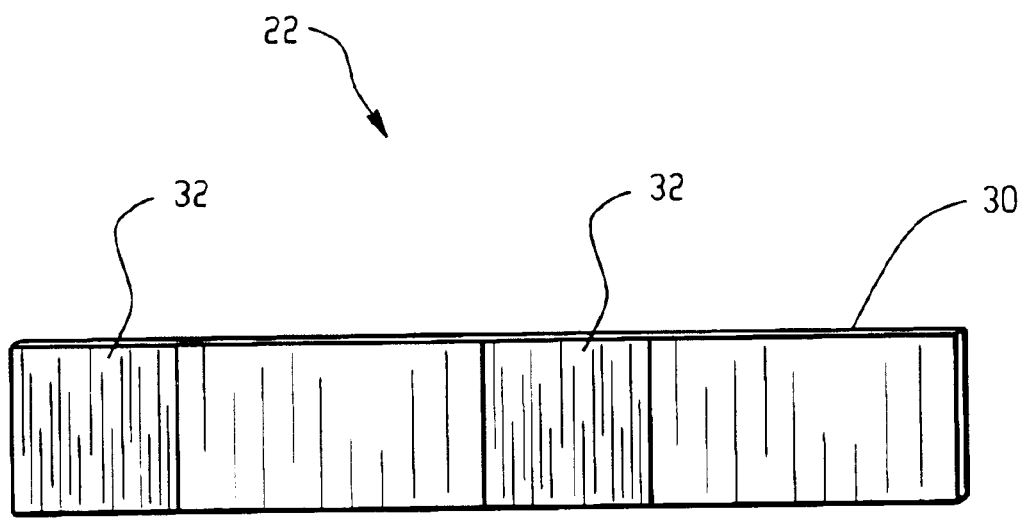
FIG. 11 is a side perspective view of an actuator strip in an unpowered state.
Figure 12:
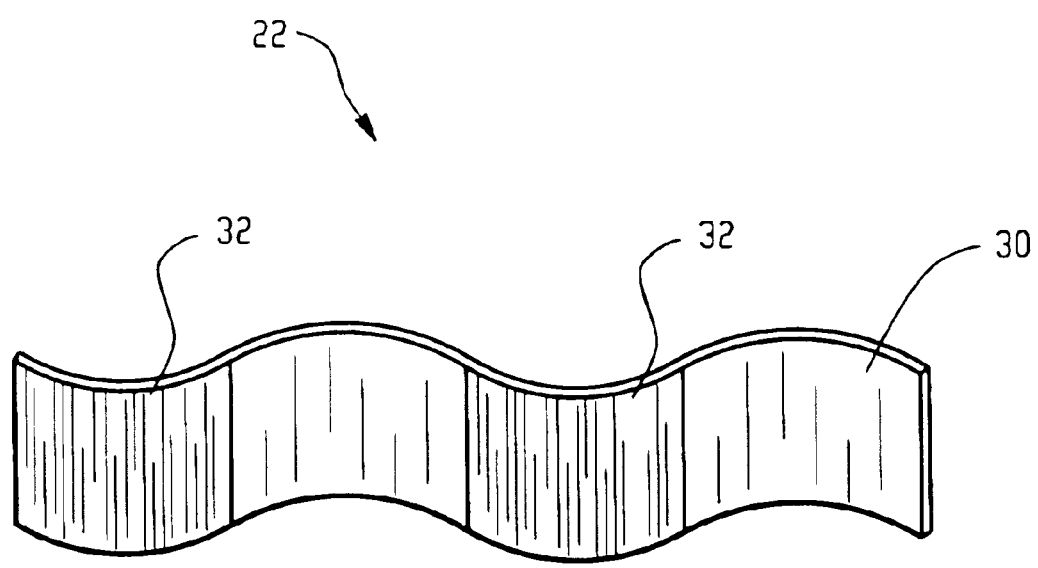
FIG. 12 is a side perspective view of the actuator strip in a powered state.

As shown more clearly in FIGS. 11 and 12, the actuator strips, 22 or 24, preferably comprise a flexible strip 31 and a piezoelectric material 32 disposed on selected portions of a surface of the flexible strip 31 to provide a shape changing capability to the actuator strips 22, 24. Upon receipt of the activation signal, the actuator strips 22, 24 will bend at those portions of the flexible strip 31 having the piezoelectric material 32. The piezoelectric material expands (or contracts) upon receipt of the activation signal causing the flexible strip to bend. In the case of expansion, the flexible strip bends inwardly. In the case of contraction, the flexible strips bend outwardly. As such, the degree of bending and the orientation of the bend along the flexible strip can be readily manipulated by the placement of the piezoelectric material 32 as well as the thicknesses of the materials employed and the physical properties thereof. For example, periodically depositing or affixing a piezoelectric material 32 onto the flexible strip 31 at equally spaced intervals will result in a serpentine shape orientation upon receipt of a suitable activation signal. Arranging the actuator strips parallel to one another in an unpowered state with this type of configuration will result in a corrugated like pattern in the powered state. The actuator strips 22 may be formed integrally with the least one support 20, or more preferably, may be fixedly attached to the support 20.

The at least two actuator strips 22, 24 can be unimorph or bimorph. A unimorph refers to a laminate of a piezoelectric material bonded to a single layer of metal whereas a bimorph refers to a laminate of a metal layer sandwiched between two layers of peizoelectric material. Preferably, the actuator strips 22, or 24 are bimorphs since bimorphs generally exhibit more displacement than unimorphs. Bimorphs exhibit more displacement than unimorphs because under the applied voltage one piezoelectric element will contract while the other expands.

One type of unimorph is a structure composed of a single piezoelectric element externally bonded to a flexible metal foil which is stimulated by a piezoelectric element when activated with a changing voltage and results in an axial buckling or deflection as it opposes the movement of the piezoelectric element. The actuator movement for a unimorph can be by contraction or expansion. An example of a pre-stressed unimorph is referred to as "THUNDER", which is an acronym for THin layer composite UNimorph ferroelectric Driver and sensor, and was developed by developed by the National Aeronautics and Space Administration. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In a preferred embodiment, the actuator strips 22 are bimorphs to provide a clam shell type configuration for disengagement. The piezoelectric material is spatially patterned on a flexible metal sheet to produce a localized periodic bowing of each metal sheet upon application of power. The actuator strips 22 are preferably arranged in an alternating fashion on the female support 20, wherein an overall corrugated pattern is formed when a power is applied. The piezoelectric bimorph clamshell configuration of the actuator strips is exemplary only and is not intended to be limited to any particular shape, size, or the like. For example, the thickness of the piezoelectric material can be adjusted in accordance with the operation and position of the piezoelectric material. In general, as the piezoelectric material layer becomes thinner, the greater the distortion it must undergo.

Suitable piezoelectric materials include, but are not intended to be limited to, inorganic compounds, organic compounds, and metals. With regard to organic materials, all of the polymeric materials with noncentrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly (vinylamine)backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly (methacrylic acid), and their derivatives; polyureas, and their derivatives; polyurethanes, and their derivatives; biomolecules such as poly-L-lactic acids and their derivatives, and cell membrane proteins, as well as phosphate biomolecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals.. Suitable metal oxides include $SiO_2$, $Al2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, AgCaSe 2, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

The protrusion element 18 may be formed integrally with support 16, or more preferably, may be fixedly attached to the support 16. In practice, spacing between each additional protrusion elements 18 is in an amount effective to provide sufficient shear, peel, and pull off resistance desired for a particular application during engagement with the opening 28. Generally, the closer the spacing and the greater the amount of protrusion elements 18 employed will result in increased shear, peel, and pull off forces upon engagement. The protrusion elements 18 preferably have a shape configured to become engaged with the actuator strips 22 comprising the opening 28 upon pressing the male portion 12 with the female portion 14, and vice versa. The protrusion elements 18 preferably have a shape that allows the protrusion elements 18 ease in mating with the opening 28 during a powered state (receiving electrical signal), while providing frictional contact with the strips 22 during an unpowered state. Conversely, as the actuator strips 22 define the shape of the opening 28, the actuator strips 22 have a shape that allows ease in mating with the protrusion elements 18 during a powered state, while providing friction contact with the protrusion elements 18 during an unpowered state. As such, the exact shape of the protrusion element will vary depend on the desired mechanism and is not intended to be limited to any form or shape.

The protrusion elements 18 may be rigid or flexible depending on the intended application. Suitable materials for the protrusion elements 18 include plastics, metals, ceramics, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. Suitable metals include, but are not intended to limited to nickel titanium based alloys, copper based alloys (e.g., copper-zinc alloys, copper-aluminum alloys, and copper-tin alloys), gold cadmium alloys, iron-platinum alloys, and the like. Further, the protrusion elements 18 can have any shape, more preferably the shape selected for the protrusion elements 18 allow for can be mated with the opening 28 when the actuator strips 26 are powered.

The supports 16, 20 and/or 30 may be rigid or flexible depending on the intended application. Suitable materials for fabricating the support include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the protrusion elements 18 or actuator strips 22) for application of the releasable fastener system to an apparatus or structure. Alternatively, the releasable fastener system 10 may be secured to an apparatus or structure by bolts, by welding, or any other mechanical securement means.

Advantageously, the releasable fastener systems are extremely versatile and can be used in a number of different applications. For example, the releasable fastener can be employed to releasably attach two automotive structural elements together to provide a mechanism that delivers different load paths in the event of an impact sufficient to activate the release mechanism. Welded and adhesively bonded "rigid" joints provide fixed load paths. The use of the remote release mechanism can be used to alter the load path. Other examples include providing a mechanism for opening and closing apparatus such as trunks, doors, glove box, and the like. The releasable fastener system may also be employed for releasable on-demand attachment mechanism such as for releasable attachment for batteries, fuels cells, cargo containers, vehicle interior and exterior components, and the like. Moreover, the releasable fastener systems can be configured such that an energy source is not required to maintain engagement of the joint. Energy, i.e., activation signal, can be used to provide separation, thereby minimizing the impact on energy sources during use of the releasable fastener system.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A releasable fastener system comprising:
   a male portion comprising a support and at least one protrusion element fixedly attached to the support;
   a female portion comprising a support and at least two parallel actuator strips projecting from a surface of the support, wherein the at least two parallel actuator strips are spaced apart to form an opening equal to or less than a lateral dimension of the protrusion element, and wherein each one of the at least two parallel actuator strips comprise a flexible strip and a piezoelectric material disposed on portions of the actuator strip; and
   an activation device coupled to the at least two actuator strips, the activation device being operable to selectively provide an activation signal to the piezoelectric material.

2. The releasable fastener system of claim 1, wherein the at least one protrusion element comprises a head portion and a body portion, wherein the head portion has a lateral dimension greater than the body portion.

3. The releasable fastener system of claim 1, wherein the activation signal comprises an electrical signal.

4. The releasable fastener system of claim 1, wherein the at least one protrusion element frictionally engages the at least two actuator strips when the male portion is pressed into face-to-face engagement with said female portion.

5. The releasable fastener system of claim 1, wherein the at least one protrusion element comprises a head portion and a body portion, and wherein the head portion mechanically engages the at least two actuator strips when the male portion is pressed into face-to-face engagement with said female portion.

6. The releasable fastener system of claim 1, wherein the at least two actuator strips comprises a unimorph structure.

7. The releasable fastener system of claim 1, wherein the at least two actuator strips comprises a bimorph structure.

8. The releasable fastener system of claim 1, wherein the at least one protrusion element comprises a cylindrical shape.

9. The releasable fastener system of claim 1, wherein the least two actuator strips are fixedly attached to a second support, wherein the second support is flexible or is non-stationary relative to the female support.

10. A process for operating a releasable fastener system, the process comprising:
    frictionally engaging at least one protrusion element of a male portion with an opening provided by at least two parallel actuator strips projecting from a surface of a female portion, wherein the at least two actuator strips comprise a flexible strip and a piezoelectric material disposed on portions of the actuator strip, wherein the flexible strip is fixedly attached at one end to a stationary support and is fixedly attached at an other end to a non-stationary support, and wherein the portions of the actuator strip comprising the piezoelectric material contact the protrusion element; and
    applying an activation signal to the piezoelectric material to increase the opening between the at least two actuator strips and release the protrusion element.

11. The process according to claim 10, wherein the non-stationary support of the female portion is flexible.

12. A process for operating a releasable fastener system, the process comprising:
    aligning at least one protrusion element of a male portion with an opening provided by at least two parallel actuator strips projecting from a support of a female portion, wherein the at least one protrusion element comprises a head portion and a body portion, wherein the head portion has a greater lateral dimension than the body portion and forms a recess portion at an interface of the head and body portions, and wherein the at least two actuator strips comprises a flexible strip and a piezoelectric material disposed on portions of the flexible strip;
    pressing the head portion of the at least one protrusion element into the opening to mechanically engage the recess portion of the at least one protrusion element against the actuator strips;
    applying an activation signal to the piezoelectric material to bend the flexible strip and increase a size of the opening between the at least two actuator strips; and
    removing the at least one protrusion element from the at least two actuator strips.

* * * * *